United States Patent
Frommelt et al.

(10) Patent No.: US 11,333,290 B2
(45) Date of Patent: May 17, 2022

(54) HEAT SHIELD WITH OUTER FIBER WINDING AND HIGH-TEMPERATURE FURNACE AND GAS CONVERTER HAVING A HEAT SHIELD

(71) Applicant: SGL CARBON SE, Wiesbaden (DE)

(72) Inventors: Sebastian Frommelt, Meitingen (DE); Markus Schroeder, Meitingen (DE); Martin Reinthaler, Meitingen (DE); Peter Pfaller, Meitingen (DE); Karl Hingst, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 906 days.

(21) Appl. No.: 14/450,441

(22) Filed: Aug. 4, 2014

(65) Prior Publication Data

US 2014/0342107 A1    Nov. 20, 2014

Related U.S. Application Data

(63) Continuation of application No. PCT/EP2012/075729, filed on Dec. 17, 2012.

(30) Foreign Application Priority Data

Feb. 3, 2012   (DE) .......................... 102012201650.3

(51) Int. Cl.
*F16L 59/08* (2006.01)
*B32B 18/00* (2006.01)
(Continued)

(52) U.S. Cl.
CPC .............. *F16L 59/08* (2013.01); *B32B 18/00* (2013.01); *C04B 37/008* (2013.01);
(Continued)

(58) Field of Classification Search
CPC ....... B32B 18/00; B32B 2597/00; B32B 1/08; B32B 9/005; B32B 9/007; B32B 5/22;
(Continued)

(56) References Cited

U.S. PATENT DOCUMENTS 4,168,013 A    9/1979   King et al.
4,912,302 A *  3/1990   Kobayashi ............... F27B 5/14
                                                 219/390

(Continued)

FOREIGN PATENT DOCUMENTS

CN    10155017 A1   10/2009
DE    3603305 C1 *  7/1987  ............ B32B 18/00
(Continued)

OTHER PUBLICATIONS

International Search Report for PCT/EP2012/075729, dated Mar. 25, 2013.*

(Continued)

*Primary Examiner* — Jeremy R Pierce
*Assistant Examiner* — Christine X Nisula
(74) *Attorney, Agent, or Firm* — Laurence A. Greenberg; Werner H. Stemer; Ralph E. Locher

(57) ABSTRACT

A hollow-cylindrical heat shield includes at least one graphite foil and at least one fiber structure, preferably a wound fiber structure, disposed on the outer side of the at least one graphite foil. The (wound) fiber structure has a degree of coverage of less than 100%. A high-temperature furnace or gas converter having a heat shield is also provided.

11 Claims, 1 Drawing Sheet

(51) Int. Cl.
*F27D 1/00* (2006.01)
*C04B 37/00* (2006.01)

(52) U.S. Cl.
CPC ......... *F27D 1/0006* (2013.01); *F27D 1/0009* (2013.01); *F27D 1/0013* (2013.01); *C04B 2235/526* (2013.01); *C04B 2235/5244* (2013.01); *C04B 2235/5248* (2013.01); *C04B 2235/5264* (2013.01); *C04B 2235/9607* (2013.01); *C04B 2237/365* (2013.01); *C04B 2237/38* (2013.01); *C04B 2237/385* (2013.01); *C04B 2237/704* (2013.01); *C04B 2237/84* (2013.01); *C04B 2237/86* (2013.01); *Y10T 428/13* (2015.01); *Y10T 428/1314* (2015.01); *Y10T 428/1362* (2015.01)

(58) Field of Classification Search
CPC .... B32B 5/24; B32B 5/26; B32B 5/28; B32B 2260/021; B32B 2260/023; B32B 2260/048; B32B 3207/306; B32B 3207/3065; B32B 3207/308; B32B 2307/304; Y10T 428/1369; Y10T 428/1362; F16L 59/027; F16L 59/029; F27D 1/0003–02; B29C 53/845; B29C 48/09; B29C 53/60; D06H 5/007; F28F 9/0132; C04B 2237/765; C04B 2237/84; C04B 35/83; C04B 2237/385; C04B 2337/84

See application file for complete search history.

(56) References Cited

U.S. PATENT DOCUMENTS

| | | | |
|---|---|---|---|
| 5,460,416 A * | 10/1995 | Freidrich | ............... E21B 17/04 138/123 |
| 6,615,878 B2 * | 9/2003 | Dewimille | .......... B29C 47/0023 138/137 |
| 6,770,161 B2 | 8/2004 | Blain et al. | |
| 8,257,495 B2 | 9/2012 | Kato et al. | |
| 2002/0003004 A1 * | 1/2002 | Guckert | .................. B29C 53/60 138/137 |
| 2002/0124932 A1 * | 9/2002 | Blain | ..................... B32B 18/00 156/87 |
| 2007/0259185 A1 * | 11/2007 | Hingst | .................... B32B 18/00 428/408 |
| 2008/0104963 A1 | 5/2008 | Grote et al. | |
| 2015/0000259 A1 * | 1/2015 | Dietz | .................... F16L 59/027 60/320 |

FOREIGN PATENT DOCUMENTS

| | | |
|---|---|---|
| DE | 10025628 A1 | 11/2001 |
| DE | 102010020193 A1 | 1/2011 |
| EP | 0248918 A1 | 12/1987 |
| EP | 2135976 A2 | 12/2009 |
| JP | H06109373 A | 4/1994 |
| JP | H10101471 A | 4/1998 |
| JP | 2001089238 A | 4/2001 |
| WO | 0142338 A2 | 6/2001 |
| WO | 2006058851 A1 | 6/2006 |

OTHER PUBLICATIONS

ANSI, DIN EN ISO 11885:2009, http://webstore.ansi.org/RecordDetail.aspx?sku=DIN+EN+ISO+11885%3a2009, accessed Dec. 22, 2016.*
ISO 11885, accessed Dec. 22, 2016.*
Espacenet translation of DE3603305C1, accessed on Oct. 10, 2019. (Year: 1987).*
Thermaflect heatshield, https://www.heatshieldproducts.com/thermaflect-shield, (Year: 2020).*

* cited by examiner

HEAT SHIELD WITH OUTER FIBER WINDING AND HIGH-TEMPERATURE FURNACE AND GAS CONVERTER HAVING A HEAT SHIELD

CROSS-REFERENCE TO RELATED APPLICATION

This is a continuation, under 35 U.S.C. § 120, of copending International Application No. PCT/EP2012/075729, filed Dec. 17, 2012, which designated the United States; this application also claims the priority, under 35 U.S.C. § 119, of German Patent Application DE 10 2012 201 650.3, filed Feb. 3, 2012; the prior applications are herewith incorporated by reference in their entirety.

BACKGROUND OF THE INVENTION

Field of the Invention

The present invention relates to a hollow-cylindrical heat shield, which is suitable for high-temperature applications, in which the heat shield is exposed to temperatures of up to 2,800° C. The invention also relates to a high-temperature furnace and a gas converter having a heat shield.

Materials based on carbon are often used as heat shields for high-temperature applications, for example as heat shields in high-temperature furnaces or gas converters, due to their high heat stability and their chemical inertness with respect to the substances present in a furnace interior. Heat shields of that type are usually hollow-cylindrical and are disposed on the outer side of the thermal insulation with which the furnace is lined.

Such heat shields are used, for example, in a high-temperature furnace so that in the event that the thermal insulation fails or is punctured, the furnace heat does not occur in a concentrated manner at a point of puncture of the insulation, but is distributed over the entire heat shield. In order to be able to perform that function, corresponding heat shields must have a high heat conductivity in the peripheral direction. In addition, such heat shields must prevent both heat losses by heat radiation and also heat losses by heat conduction and convection as effectively as possible. In order to perform all of those functions, such heat shields usually include a number of plies of graphite foil, between which intermediate fabric layers can additionally be provided. In order to achieve a sufficient mechanical strength and stability of the heat shields, the individual plies of the structure are adhesively bonded to one another by a carbon-containing adhesive.

However, such adhesives to a certain extent contain constituents that are not temperature-resistant, which degrade at increased temperature and produce bubbles in the adhesive. As a result of the gradual degradation of the adhesive with the high-temperature application and a gradual wear of the adhesive by the furnace atmosphere, the individual graphite foil plies delaminate with continued use, as a result of which the heat shield thereof loses its mechanical strength and stability.

SUMMARY OF THE INVENTION

It is accordingly an object of the invention to provide a heat shield with an outer fiber winding and a high-temperature furnace and a gas converter having a heat shield, which overcome the hereinafore-mentioned disadvantages of the heretofore-known devices of this general type. In particular, it is an object of the present invention to provide a heat shield which is suitable for high-temperature applications and in particular for high-temperature furnaces and gas converters, which has a sufficiently high mechanical strength and stability, which maintains this high mechanical strength and stability even in cases of longer high-temperature application, such as in particular a longer high-temperature application in which the heat shield is exposed to a temperature between 300 and 2,800° C., which is structured in a simple manner and which can be produced cost-effectively.

With the foregoing and other objects in view there is provided, in accordance with the invention, a hollow-cylindrical heat shield, comprising at least one graphite foil, on the outer side of which there is provided at least one fiber structure, wherein the fiber structure has a degree of coverage of less than 100%. In this case, the fiber structure is preferably a wound fiber structure, a woven fabric, a weft knitted fabric, a warp knitted fabric or a non-crimp fabric and is particularly preferably a wound fiber structure.

This construction is based on the finding that, by providing a fiber structure, preferably such as a wound fiber structure, on the outer side of a graphite foil rolled together to form a hollow cylinder, on the inner side of which one or more further graphite foils are disposed or can be disposed, wherein one or more layers made of a fiber composite material and in particular of a carbon fiber reinforced composite material are provided or can be provided on the inner side of the innermost graphite foil, and wherein fabric layers or layers made of a composite material are optionally disposed between the individual graphite foils, the individual layers are interconnected rigidly and in a manner fixed against delamination, in such a way that, even without use of an adhesive or by application of adhesive merely to small and selected areas of the graphite foil, a hollow-cylindrical heat shield is obtained on the whole, which has a high mechanical stability and a high mechanical strength. In particular, this high mechanical stability and high mechanical strength are maintained, even after a long high-temperature treatment and after repeated high-temperature treatments at temperatures of up to 2,800° C. Due to the fiber structure, preferably a wound fiber structure, having a degree of coverage of less than 100%, gaps are provided between the windings or turns of the (wound) fiber structure in spite of the high mechanical stability and high mechanical strength achieved by the (wound) fiber structure, in such a way that, during a high-temperature application, the underlying graphite foil, which has a higher coefficient of thermal expansion than the (wound) fiber structure, can expand over the gap or the gaps, at least in regions, in such a way that any stresses in the heat shield during the temperature treatment are reliably avoided, even with quick and frequent temperature changes, which can destroy or at least damage the heat shield. Due to the high heat conductivity of graphite foil in the foil plane and due to the comparatively low heat conductivity of graphite foil perpendicularly to the foil plane, an excellent heat distribution is achieved in the peripheral direction of the heat shield in the heat shield according to the invention and a heat loss due to heat conduction is reliably avoided. Further, the graphite foils have a high degree of heat reflection, which is why a heat loss caused by heat radiation is also reliably prevented. On the whole, the heat shield according to the invention thus has a much longer service life than conventional heat shields based on adhesive. A further advantage of the heat shield according to the invention is that it is structured in a simple manner and therefore can be produced cost-effectively. As a result of all of this, the heat shield according to the invention is superbly suited for use in a high-temperature furnace or in a gas converter.

In accordance with a particularly preferred embodiment of the present invention, at least one layer made of a fiber composite material is provided on the inner side of the at least one graphite foil in order to provide the heat shield with an improved mechanical stability. In this case, the at least one layer made of the fiber composite material can be disposed on the inner side of the at least one graphite foil immediately, that is to say directly or without one or more further intermediate layers, or in a manner separated by one or more intermediate layers. In this embodiment, the fiber composite material is preferably carbon fiber reinforced carbon, that is to say a composite material in which carbon fibers are embedded in a carbon matrix, ceramic fiber reinforced carbon, that is to say a composite material in which ceramic fibers are embedded in a carbon matrix, carbon fiber reinforced ceramic, that is to say a composite material in which carbon fibers are embedded in a ceramic matrix, or ceramic fiber reinforced ceramic, that is to say a composite material in which ceramic fibers, such as SiC fibers, are embedded in a ceramic matrix, for example silicon carbide (SiC).

As presented above, the (wound) fiber structure (whereby the term "fiber structure" is understood herein to mean "preferably wound fiber structure") provided on the outer side of the at least one graphite foil has a degree of coverage in accordance with the invention of less than 100% in order to avoid the occurrence of stresses in the heat shield resulting from the different coefficients of thermal expansion of the graphite foil(s) and of the (wound) fiber structure during a temperature treatment, and in particular also in the event of quick and frequent temperature changes. Particularly good results are obtained in this regard when the (wound) fiber structure has a degree of coverage from 5 to 95%, preferably from 10 to 65%, particularly preferably from 30 to 55% and even more preferably from 40 to 50%. In the context of the present invention, a degree of coverage of the (wound) fiber structure is understood to mean the ratio between the part of the surface of the underlying graphite foil covered by the (wound) fiber structure and the total surface of the graphite foil. The degree of coverage can be set to an arbitrary value in the case of a wound fiber structure, for example through the type of winding of the wound fiber structure, by providing corresponding large or small gaps between the individual winding turns. In this case, corresponding gaps can be formed between all winding turns or only between individual winding turns.

In accordance with a development of the inventive concept, it is proposed for the wound fiber structure to be a cross winding, wherein the winding angle of the individual winding turns, based on the hollow cylinder longitudinal axis, is preferably between 5 and 88°, more preferably between 30 and 85°, particularly preferably between 60 and 80°, even more preferably between 70 and 80° and most preferably approximately 75°. A particularly rigid connection, which is fixed against delamination, of the individual layers to one another is thus achieved in a simple manner and at the same time it is made possible to easily set a degree of coverage of the wound fiber structure as defined above. In the context of the present invention, a cross winding is understood to mean a winding in which the winding angles of the individual winding turns are the same in terms of value, however the winding angles of the individual winding turns of adjacent winding plies differ in terms of their sign. Further, the winding angle is understood to mean the angle that is enclosed by the longitudinal axis of a winding turn with respect to the longitudinal axes of the hollow-cylindrical heat shield.

The present invention is not limited with respect to the type of fiber structure forming the winding. By way of example, the fiber structure of the (wound) fiber structure can be selected from the group consisting of cords, twines, yarns, rovings, non-wovens, woven fabrics, warp knitted fabrics, weft knitted fabrics, felts, cords impregnated with matrix, twines impregnated with matrix, yarns impregnated with matrix, rovings impregnated with matrix, non-wovens impregnated with matrix, woven fabrics impregnated with matrix, warp knitted fabrics impregnated with matrix, weft knitted fabrics impregnated with matrix, felts impregnated with matrix, and any mixtures of two or more of the aforementioned fiber structures. The fiber structure of the (wound) fiber structure is preferably selected from the group consisting of cords, twines, yarns, rovings, warp knitted fabrics, weft knitted fabrics, woven fabrics, cords impregnated with matrix, twines impregnated with matrix, yarns impregnated with matrix, rovings impregnated with matrix, warp knitted fabrics impregnated with matrix, weft knitted fabrics impregnated with matrix, woven fabrics impregnated with matrix, and any mixtures of two or more of the aforementioned fiber structures, because a particularly rigid connection of the individual layers to one another is thus achieved at the same time and an optimal degree of coverage of the (wound) fiber structure can be set at the same time in a simple manner. For the same reasons, it is particularly preferable if the (wound) fiber structure is a roving or a roving impregnated with matrix.

In accordance with a development of the inventive concept, it is proposed for the (wound) fiber structure to be a composite material, in which the fibers are impregnated with a matrix. The fibers sensitive to laterally acting forces are thus protected by the matrix material. In this case, the matrix material can be any material which effectively protects fibers against acting forces and which additionally is stable at the temperatures occurring during use of the heat shield. The matrix material is preferably carbon, such as in particular carbonized and/or graphitized phenol resin, carbonized and/or graphitized epoxy resin, carbonized and/or graphitized novolak, carbonized and/or graphitized cyanate ester resin, carbonized and/or graphitized benzoxazine resin, carbonized and/or graphitized polyester, carbonized and/or graphitized vinyl ester, carbonized and/or graphitized bismaleimide resin and/or carbonized and/or graphitized bisoxazoline. Accordingly, the (wound) fiber structure is preferably selected from the group consisting of cords impregnated with matrix, twines impregnated with matrix, yarns impregnated with matrix, rovings impregnated with matrix, non-wovens impregnated with matrix, woven fabrics impregnated with matrix, warp knitted fabrics impregnated with matrix, weft knitted fabrics impregnated with matrix, felts impregnated with matrix, and any mixtures of two or more of the aforementioned fiber structures, wherein the matrix is composed of a material that is selected from the group consisting of carbonized and/or graphitized phenol resins, epoxy resins, novolaks, cyanate ester resins, benzoxazine resins, polyesters, vinyl esters, bismaleimide resins, bisoxazolines, and any mixtures of two or more of the aforementioned materials. The (wound) fiber structure is particularly preferably a roving impregnated with carbonized and/or graphitized epoxy resin and/or a twine impregnated with carbonized and/or graphitized epoxy resin and/or a yarn impregnated with carbonized and/or graphitized epoxy resin and/or a cord impregnated with carbonized and/or graphitized epoxy resin.

In accordance with a further preferred embodiment of the present invention, the fibers of the (wound) fiber structure are carbon fibers and/or ceramic fibers wherein, in the case of ceramic fibers, silicon carbide fibers are particularly preferred. Fibers of that type are particularly tear-resistant and resistant to high temperatures up to 2,800° C. and therefore lead to a permanently stable connection of the individual layers to one another.

In the case of carbon fibers, it is preferable for the carbon fibers to have a carbon content of at least 60% by weight, more preferably of at least 80% by weight, in particular preferably of at least 90% by weight, particularly preferably of at least 95% by weight, even more preferably of at least 99% by weight, and most preferably of at least 99.5% by weight.

In this case, the carbon fibers may be fibers that have been produced from corresponding precursor fibers, such as polyacrylonitrile fibers, by carbonization at a temperature between 600 and 1,200° C. and/or by graphitization at a temperature between 2,000 and 2,800° C.

In principle, the present invention is not limited with respect to the dimensions of the fibers forming the (wound) fiber structure. Good results are obtained in this case in particular when the fibers of the (wound) fiber structure are carbon fibers with a diameter from 3 to 20 μm and/or silicon carbide fibers with a diameter from 3 to 20 μm.

The present invention also is not limited with respect to the length of the fibers forming the (wound) fiber structure. In particular, the fibers may be endless fibers or fibers, in particular carbon fibers and/or silicon carbide fibers, with a length between 6 and 100 mm.

Depending on the number and the thickness of the graphite foil(s) being used and the additional layer(s) made of fiber composite material, the (wound) fiber structure may include a fiber structure ply or a number of fiber structure plies, for example 1 to 10, 2 to 7, 4 to 6 or 5. In this case, the thickness of the (wound) fiber structure, that is to say the sum of the thicknesses of all fiber structure plies, is preferably 0.05 to 5 mm, particularly preferably 0.1 to 3 mm and even more preferably 0.2 to 1 mm.

In order to achieve a particularly good heat distribution in the peripheral direction of the heat shield, it is proposed in accordance with a development of the inventive concept for the at least one graphite foil to have a heat conductivity in the foil plane of from 50 to 1,500 W/(m·K). Particularly good results are achieved in this regard when the at least one graphite foil has a heat conductivity in the foil plane of from 100 to 800 W/(m·K) and particularly preferably from 120 to 600 W/(m·K).

In order to avoid a thermal dissipation through the at least one graphite foil and therefore from the heat shield outwardly, the at least one graphite foil in accordance with a further preferred embodiment of the present invention has a heat conductivity perpendicularly to the foil plane of from 1 to 50 W/(m·K), preferably from 1 to 20 W/(m·K) and particularly preferably from 2 to 8 W/(m·K).

As presented, on one hand the heat conductivity of the at least one graphite foil in the foil plane is preferably high in order to achieve a heat distribution in the peripheral direction of the heat shield, and on the other hand the heat conductivity of the at least one graphite foil perpendicularly to the foil plane is preferably low in order to avoid a heat dissipation through the graphite foil. For this reason, it is preferable for the ratio of the heat conductivity of the at least one graphite foil in the foil plane to the heat conductivity of the at least one graphite foil perpendicularly to the foil plane to be more than 5:1, preferably more than 20:1, and particularly preferably more than 30:1.

It is also preferable for the at least one graphite foil, in the presence of a test medium constituted by helium and at a pressure difference of 1 bar, to have a gas permeability of from 5 to 0.005 mg/m²·s, preferably from 1.0 to 0.01 mg/m²·s, and particularly preferably from 0.8 to 0.05 mg/m²·s.

In accordance with a further preferred embodiment of the present invention, the at least one graphite foil is formed of natural graphite. This is therefore preferred because natural graphite has a higher degree of anisotropy compared with synthetic graphite due to a better lattice quality and a higher degree of graphitization, and consequently has a greater ratio of heat conductivity in the lattice plane to heat conductivity perpendicularly to the lattice plane. Good results both in view of a good flexibility of the graphite foil and in view of a sufficiently high heat reflection of the graphite foil are obtained in particular when the at least one graphite foil made of natural graphite has a thickness of from 0.1 to 3 mm.

The heat shield according to the invention may contain a ply of a graphite foil, which is preferably hollow-cylindrical. Alternatively, the heat shield according to the invention, depending on the intended use, may have a plurality of plies made of graphite foil disposed above one another, which for example can be achieved by rolling together a graphite foil, for example by scrolling or spiral winding, in such a way that a plurality of plies of the graphite foil are disposed above one another flushly or offset relative to one another. Alternatively, layers of a plurality of graphite foils can also be disposed above one another wherein, in this case, intermediate layers, for example made of fabric or carbon fiber reinforced carbon, can be disposed between the individual layers. In this case, the individual graphite foils may have the same or different properties. The heat shield according to the invention preferably includes 1 to 40 and preferably 5 to 20 plies, disposed above one another, of a graphite foil and/or 5 to 40 and preferably 8 to 20 layers of graphite foils, wherein the individual plies or the individual layers are each hollow-cylindrical. In this embodiment, adhesive can be provided in regions between the individual plies or layers, such as carbonized adhesive, for example carbonized adhesive based on epoxy resin.

If the heat shield according to the invention contains a plurality of plies or layers of graphite foil, the overall thickness of the graphite foil plies or graphite foil layers, both in view of a good heat distribution in the foil peripheral direction and in view of a sufficiently high heat reflection, is preferably 1 to 30 mm, particularly preferably 5 to 20 mm, even more preferably 7.5 to 15 mm, and most preferably approximately 10 mm.

In accordance with a development of the inventive concept, it is proposed for the at least one graphite foil to have an ash content, determined in accordance with DIN (German Industry Standard) EN 11885 ICP-OES, of at most 5%, preferably of at most 2%, particularly preferably of at most 0.15%, even more preferably of at most 100 ppm, and most preferably of at most 5 ppm. Due to a correspondingly high degree of purity of the graphite foil(s), a contamination of the furnace atmosphere with impurities in the event of a high-temperature use is effectively avoided.

As presented above, in accordance with a particularly preferred embodiment of the present invention, at least one layer made of a fiber composite material is to be provided on the inner side of the at least one graphite foil in order to provide the heat shield with an improved mechanical stability. In this embodiment, the fiber structure contained in the at least one layer made of fiber composite material is preferably selected from the group consisting of rovings, non-wovens, woven fabrics, warp knitted fabrics, weft knitted fabrics, felts, and any mixtures of two or more of the aforementioned fiber structures.

The present invention is not limited with respect to the type of material of the matrix of the at least one layer made of fiber composite material. However, good results are obtained in particular when the matrix of the at least one layer made of fiber composite material is composed of a material selected from the group consisting of carbonized and/or graphitized phenol resins, carbonized and/or graphitized epoxy resins, carbonized and/or graphitized novolaks, carbonized and/or graphitized cyanate ester resins, carbonized and/or graphitized benzoxazine resins, carbonized and/or graphitized polyesters, carbonized and/or graphitized vinyl esters, carbonized and/or graphitized bismaleimide, carbonized and/or graphitized bisoxazolines, and any mixtures of two or more of the aforementioned materials. The matrix is particularly preferably composed of carbonized and/or graphitized phenol resin.

It is proposed in accordance with a development of the inventive concept for the fibers of the at least one layer made of fiber composite material to be carbon fibers and/or ceramic fibers, preferably silicon carbide fibers, since fibers of this type are particularly tear-resistant and resistant to high temperatures up to 2,800° C.

In the case of carbon fibers it is preferable for the carbon fibers of the at least one layer made of fiber composite material to have a carbon content of at least 60% by weight, more preferably of at least 80% by weight, in particular preferably of at least 90% by weight, particularly preferably of at least 95% by weight, even more preferably of at least 99% by weight, and most preferably of at least 99.5% by weight.

These carbon fibers are preferably also fibers that have been produced from corresponding precursor fibers, such as polyacrylonitrile fibers, by carbonization at a temperature between 600 and 1,200° C. or by graphitization at a temperature between 2,000 and 2,800° C.

In principal, the present invention is not limited with respect to the dimensions of the fibers forming the fiber composite material. Good results are obtained in this case in particular when the fibers of the (wound) fiber structure are carbon fibers with a diameter of from 3 to 20 μm and/or silicon carbide fibers with a diameter of from 3 to 20 μm.

The present invention also is not limited with respect to the length of the fibers forming the fiber composite material. In particular, the fibers may be endless fibers or fibers, in particular carbon fibers and/or silicon carbide fibers, with a length between 6 and 100 mm.

Depending on the intended use, the heat shield according to the invention may include one or more layers made of fiber composite material. In this case, good results are obtained in particular when the heat shield includes 1 to 50, preferably 1 to 30 and particularly preferably 1 to 15, for example 7 or 8, layers made of fiber composite material. In this case, the individual layers, which are preferably laminated above one another, can be the same or different.

In an exemplary embodiment of the present invention, the heat shield includes 1 to 30 and preferably 3 to 15 layers made of fiber composite material and preferably made of carbon fiber rovings and/or carbon fiber fabrics impregnated with carbon matrix, which are disposed in a manner laminated above one another.

In another exemplary embodiment of the present invention, the heat shield includes 1 to 30 and preferably 3 to 15 layers made of fiber composite material and preferably made of carbon fiber rovings and/or carbon fiber fabrics impregnated with carbon matrix, which are wound one above the other.

The two aforementioned embodiments can also be combined with one another, in such a way that the heat shield includes 1 to 30 and preferably 3 to 15 layers made of fiber composite material and preferably made of carbon fiber rovings and/or carbon fiber fabrics impregnated with carbon matrix, of which some are disposed in a manner laminated above one another and some are wound one above the other.

In the case of the two last-mentioned embodiments, the winding angles of the individual layers, based on the hollow cylinder longitudinal axis, can differ from one another for example by at least 10°, preferably by at least 20°, and particularly preferably by at least 30°.

In order to obtain a sufficient mechanical stability of the heat shield, it is proposed in accordance with a development of the inventive concept for the sum of the thicknesses of all layers made of fiber composite material disposed on the inner side of the at least one graphite foil to be 0.1 to 10 mm, and preferably 2 to 4 mm.

In a further optional embodiment of the present invention, the heat shield includes at least 2 graphite foils and at least one intermediate layer, wherein the at least one intermediate layer is provided between the at least one layer made of fiber composite material and one of the graphite materials. In this case, the number of intermediate layers can be 1 to 50, preferably 1 to 20, and particularly preferably 1 to 10. Any temperature-resistant material can be used as a material for the intermediate layer(s).

It is further preferable for the heat shield according to the invention to have an ash content, determined in accordance with DIN EN 11885 ICP-OES, of at most 5%, preferably of at most 2%, particularly preferably of at most 0.15%, even more preferably of at most 100 ppm, and most preferably of at most 5 ppm. Due to such a high degree of purity of the heat shield, a contamination of the furnace atmosphere in the case of a high-temperature application with impurities can be effectively avoided.

With the objects of the invention in view, there is concomitantly provided a high-temperature furnace or gas converter, comprising the previously described heat shield. In particular, the heat shield according to the invention is suitable for applications in which it is exposed, for example in a high-temperature furnace or in a gas converter, in an inert gas atmosphere or under vacuum, to a temperature of up to 2,800° C., or in which the heat shield is exposed, for example in a high-temperature furnace or in a gas converter, in air, to a temperature of up to 300° C.

Other features which are considered as characteristic for the invention are set forth in the appended claims.

Although the invention is illustrated and described herein as embodied in a heat shield with an outer fiber winding and a high-temperature furnace and a gas converter having a heat shield, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
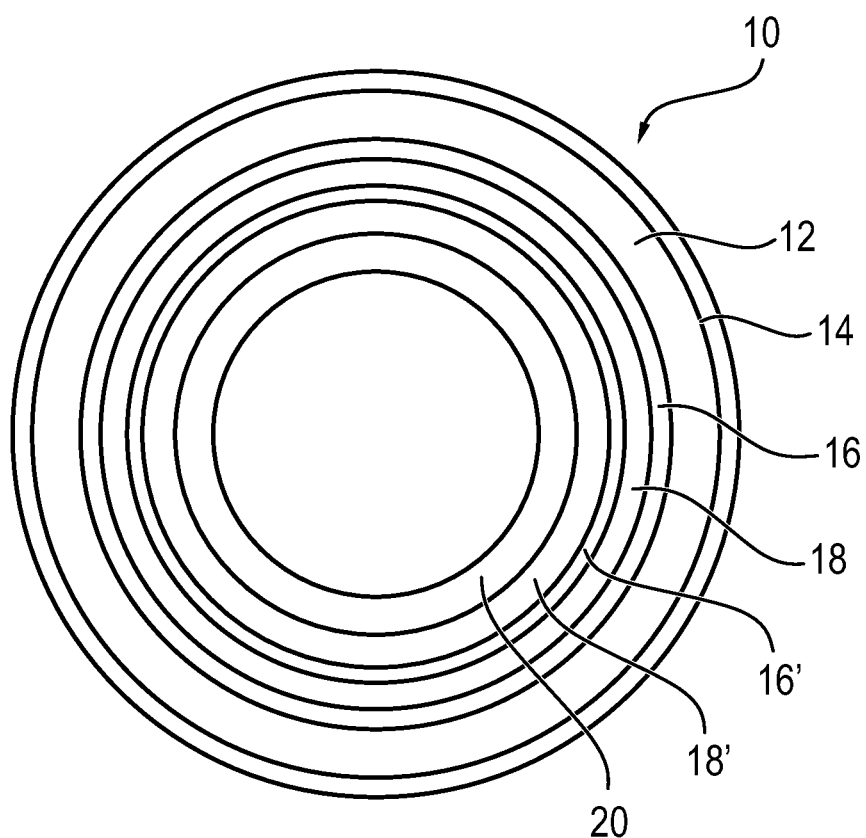
FIG. 1 is a diagrammatic, cross-sectional view of a heat shield in accordance with an exemplary embodiment of the present invention.

Referring now to the figures of the drawings in detail and first, particularly, to FIG. 1 thereof, there is seen a heat shield 10 which is hollow-cylindrical and includes a graphite foil 12 that is rolled up to form a hollow cylinder including ten plies disposed flushly and directly above one another. Whereas a wound fiber structure 14 in the form of a cross winding made of carbon-impregnated carbon fibers is applied to the outer side of the outermost ply of the graphite foil 12 (as viewed from the central axis of the hollow cylinder), a fiber composite material layer 16 made of wound carbon-impregnated carbon fibers with a first winding angle is disposed on the inside of the innermost ply of the graphite foil 12. A fiber composite material layer 18 made of wound carbon-impregnated carbon fibers with a second winding angle in turn is disposed on the inner side of the fiber composite material layer 16. A further fiber composite material layer 16' made of wound carbon-impregnated carbon fibers with the first winding angle is disposed on the inner side of the fiber composite material layer 18. A further fiber composite material layer 18' made of wound carbon-impregnated carbon fibers with the second winding angle is disposed on the inner side of the fiber composite material layer 16'. Finally, a layer 20 made of fiber composite material in the form of carbon fiber fabric reinforced carbon is disposed on the inner side of the fiber composite material layer 18'. Whereas the outer wound fiber structure 14 interconnects the graphite foil 12 and the fiber composite layers 16, 16', 18, 18', 20 rigidly and in a manner fixed against delamination, wherein this rigid connection, due to the temperature resistance of carbon fibers, is maintained even after a long high-temperature treatment and after repeated high-temperature treatments up to temperatures of 2,800° C., the outer wound fiber structure 14, the innermost fiber composite material layer 20 and the fiber composite material layers 16, 16', 18, 18' provide the heat shield 10 with excellent mechanical stability and in particular stabilize the graphite foil 12. The graphite foil 12 in turn reflects heat radiation and leads to an excellent heat distribution in the peripheral direction of the heat shield.

Figure 2:
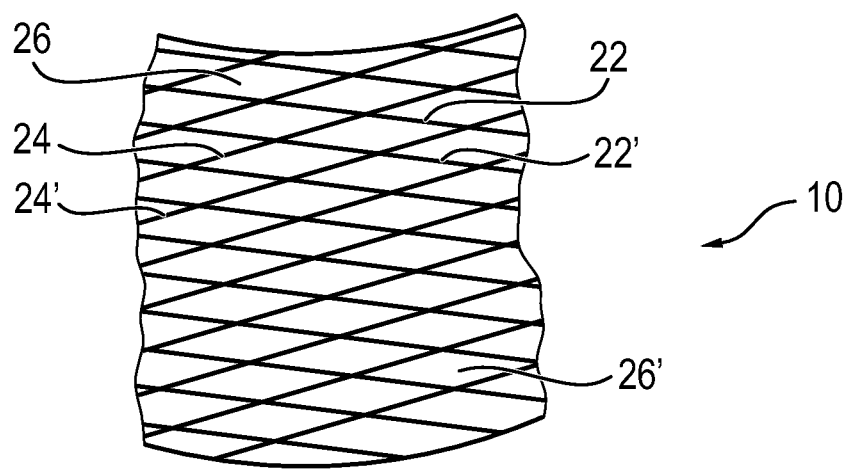
FIG. 2 is an enlarged, fragmentary, side-elevational view of a portion of the heat shield shown in FIG. 1.

As is diagrammatically illustrated in FIG. 2, the wound fiber structure 14 is formed of a cross winding, which includes first winding turns 22, 22' with a first winding angle and second winding turns 24, 24' with a second winding angle, wherein the first winding angle and the second winding angle are the same in terms of value, however the two winding angles differ in terms of their sign. As can be seen from FIG. 2, the wound fiber structure 14 has a degree of coverage, that is to say a ratio between the part of the surface of the underlying graphite foil 12 covered by the wound fiber structure 14 and the total surface of the graphite foil 12, of considerably less than 100%, in the present case of approximately 35%. Due to this low degree of coverage of the wound fiber structure, gaps 26, 26' are provided between the turns 22, 22', 24, 24' of the wound fiber structure 14 in spite of the high mechanical stability and high mechanical strength achieved by the wound fiber structure, in such a way that the underlying graphite foil 12, which has a higher coefficient of thermal expansion than the wound fiber structure 14, can expand at least in regions over the gap or gaps 26, 26' during a high-temperature application, in such a way that any stresses in the heat shield 10 during the temperature treatment can be reliably avoided even with quick and frequent temperature changes, which can destroy or at least damage the heat shield.

The invention claimed is:

1. A gas converter comprising:
a hollow-cylindrical heat shield having:
at least one graphite foil having an outer side; and
at least one fiber structure disposed directly on and in contact with said outer side of said at least one graphite foil, said at least one fiber structure having a degree of coverage selected from the group consisting of 5 to 95%, 10 to 65%, 30 to 55% and 40 to 50%, and said fiber structure being formed of carbon fibers and/or ceramic fibers.

2. The gas converter according to claim 1, wherein said at least one fiber structure is a wound fiber structure, a woven fabric, a weft knitted fabric, a warp knitted fabric or a non-crimp fabric.

3. The gas converter according to claim 1, which further comprises:
at least one layer made of a fiber composite material;
said at least one layer made of a fiber composite material being disposed immediately on an inner side of said at least one graphite foil or separated from said inner side of said at least one graphite foil by one or more intermediate layers; and
said fiber composite material being carbon fiber reinforced carbon, ceramic fiber reinforced carbon, carbon fiber reinforced ceramic or ceramic fiber reinforced ceramic.

4. The gas converter according to claim 1, wherein said at least one fiber structure is a cross winding having individual winding turns with a winding angle relative to a hollow cylinder longitudinal axis selected from the group consisting of between 5 and 88°, between 30 and 85°, between 60 and 80°, between 70 and 80°, and 75°.

5. The gas converter according to claim 1, wherein:
said at least one fiber structure is selected from the group consisting of cords impregnated with matrix, twines impregnated with matrix, yarns impregnated with matrix, rovings impregnated with matrix, non-wovens impregnated with matrix, woven fabrics impregnated with matrix, warp knitted fabrics impregnated with matrix, weft knitted fabrics impregnated with matrix, felts impregnated with matrix, and any mixtures of two or more of the aforementioned fiber structures; and
said matrix is composed of a material selected from the group consisting of carbonized and/or graphitized phenol resins, epoxy resins, novolaks, cyanate ester resins, benzoxazine resins, polyesters, vinyl esters, bismaleimide resins, bisoxazolines, and any mixtures of two or more of the aforementioned materials.

6. The gas converter according to claim 1, wherein said at least one fiber structure includes one ply or at least two plies, and said at least one fiber structure has a thickness of 0.05 to 5 mm, 0.1 to 3 mm or 0.2 to 1 mm.

7. The gas converter according to claim 1, which further comprises a ratio of a heat conductivity of said at least one graphite foil in a foil plane to a heat conductivity of said at least one graphite foil perpendicularly to said foil plane of more than 5:1, more than 20:1 or more than 30:1.

8. The gas converter according to claim 1, wherein:
said at least one graphite foil includes at least one of:
1 to 40 or 5 to 20 plies disposed above one another, or
5 to 40 or 8 to 20 layers of different graphite foils.

9. The gas converter according to claim 3, wherein said at least one layer made of fiber composite material contains a fiber structure selected from the group consisting of rovings, non-wovens, woven fabrics, warp knitted fabrics, weft knitted fabrics, felts, and any mixtures of two or more of the aforementioned fiber structures.

10. The gas converter according to claim 3, wherein said at least one layer made of fiber composite material has a matrix composed of a material selected from the group consisting of carbonized and/or graphitized phenol resins, epoxy resins, novolaks, cyanate ester resins, benzoxazine resins, polyesters, vinyl esters, bismaleimide resins, bisoxazolines, and any mixtures of two or more of the aforementioned materials.

11. The gas converter according to claim 3, wherein said at least one layer made of fiber composite material includes at least one of carbon fibers, ceramic fibers or silicon carbide fibers.

\* \* \* \* \*